United States Patent
Maruyama et al.

(10) Patent No.: US 7,283,447 B2
(45) Date of Patent: Oct. 16, 2007

(54) OPTICAL DISC AND OPTICAL DISC APPARATUS

(75) Inventors: Sumitaka Maruyama, Kyoto (JP); Katsuo Iwata, Tokyo (JP); Kazuo Watabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/528,579

(22) Filed: Sep. 28, 2006

(65) Prior Publication Data
US 2007/0019532 A1   Jan. 25, 2007

Related U.S. Application Data

(63) Continuation-in-part of application No. 10/650,132, filed on Aug. 28, 2003.

(30) Foreign Application Priority Data

Aug. 28, 2002  (JP) .............. 2002-249202
Mar. 31, 2003  (JP) .............. 2003-096300
Jun. 5, 2003   (JP) .............. 2003-161032

(51) Int. Cl.
*G11B 7/00*   (2006.01)

(52) U.S. Cl. .............. 369/111; 369/286; 369/275.1; 369/283

(58) Field of Classification Search .............. None
See application file for complete search history.

(56) References Cited

U.S. PATENT DOCUMENTS 5,841,753 A    11/1998  Holtslag et al.
6,242,066 B1    6/2001  Yamasaki et al.
6,246,656 B1    6/2001  Kawakubo et al.
2003/0108813 A1  6/2003  Watabe et al.
2005/0237915 A1* 10/2005 Watabe et al. .............. 369/283

FOREIGN PATENT DOCUMENTS

| CN | 1231473 A | 10/1999 |
|----|-----------|---------|
| CN | 1336655 A | 2/2002 |
| EP | 0 994 470 A2 | 4/2000 |
| EP | 1 202 264 A2 | 5/2002 |

(Continued)

OTHER PUBLICATIONS

European Search Report dated Oct. 25, 2006 for Appln. No. 03019195.1-2210.

(Continued)

*Primary Examiner*—Wayne Young
*Assistant Examiner*—Adam R. Giesy
(74) *Attorney, Agent, or Firm*—Pillsbury Winthrop Shaw Pittman, LLP (57) ABSTRACT

The refractive index of a light transmission layer of an optical disk is set within the range of 1.45 to 1.75, the numerical aperture of a lens emitting laser light which is incident onto the light transmission layer is set to 0.65, and the wavelength range of the laser light is set within the range of 395 to 415 nm. Further, in order that aberrations fall within the range of certain acceptable values, the thickness t of the light transmission layer is set within the range of $f(n)-t1 \leq t \leq f(n)+t2$, employing constants t1, t2 determined based on an acceptable value of aberration and function $f(n)$ of the refractive index n.

4 Claims, 6 Drawing Sheets

FOREIGN PATENT DOCUMENTS

| | | |
|---|---|---|
| JP | 08-273199 | 10/1996 |
| JP | 2000-123416 | 4/2000 |
| JP | 2002-163830 | 6/2002 |
| WO | WO 02/29800 A1 | 4/2002 |
| WO | WO 02/059890 | 8/2002 |

OTHER PUBLICATIONS

Marchant et al. "Optical Recroding" Optical Recording: Technical Overview, Reading, Addison Wesley; U.S.; 1990; pp. 125-132; XP 002084441.

* cited by examiner

OPTICAL DISC AND OPTICAL DISC APPARATUS

CROSS-REFERENCE TO RELATED APPLICATIONS

This application is a continuation in part of co-pending U.S. application Ser. No. 10/650,132, filed Aug. 28, 2003, and for which priority is claimed under 35 U.S.C. §120. This application is based upon and claims the benefit of priority under 35 U.S.C. § 119 from the prior Japanese Patent Applications No. 2002-249202, filed Aug. 28, 2002; No. 2003-096300, filed Mar. 31, 2003; and No. 2003-161032, filed Jun. 5, 2003, the entire contents of all of which are incorporated herein by reference.

BACKGROUND OF THE INVENTION

1. Field of the Invention

The present invention relates to an optical disk capable of high density recording.

2. Description of the Related Art

As well known, in recent years, as an optical disk capable of high density recording of information, a DVD having a single layer per side capacity of 4.7 GB has been put into practical use. There exist DVD types such as a DVD-ROM for the exclusive use of reproduction, a rewritable DVD-RAM, and the like. A DVD is constructed in such a way that an information recording layer is formed on a transparent substrate (hereafter, referred to as a light transmission layer) having a thickness of 0.6 mm, and laser light is allowed to pass through the light transmission layer to converge on the information recording surface to write or read information. The numerical aperture (NA) of an objective lens for converging a beam of this time is 0.6 as a reference. The refractive index n of the light transmission layer is specified to be the range, n=1.45 to 1.65, with respect to the wavelength of 650 nm, and a light transmission layer material suitable for this condition is selected. As such light transmission layer material, polycarbonate is generally employed, and the refractive index in this case is n=1.58.

Although the reference of the thickness of the light transmission layer of a DVD is 0.6 mm as described above, it is unavoidable that a thickness dispersion occurs from the viewpoint of manufacturing of disks. In an optical system to record and reproduce a DVD, in the case where the light transmission layer is designed in such a way that the standard value of the thickness thereof is 0.6 mm, if the thickness of a substrate is manufactured departing from 0.6 mm, aberration occurs. Since such aberration of an optical system increases a beam spot diameter and adversely affects reproduction of a signal, it is necessary to restrain the aberration to a predetermined value or less from the viewpoint of the system.

The aberration of the optical system due to a thickness error of the light transmission layer is determined by both a deviation from a standard value of the light transmission layer and a deviation from a standard value of the refractive index of the light transmission layer. Accordingly, in the case of a DVD, in order to restrain the aberration of the optical system caused by a thickness error of the light transmission layer to a constant value or less, the range of the light transmission layer thickness is specified as a two-dimensional range of the light transmission layer thickness and the refractive index thereof. This range is disclosed for example in Jpn. Pat. Appln. KOKAI Publication No. 8-273199. That is, with respect to the range of the refractive index, n=1.45 to 1.65, in the case where the error of the light transmission layer thickness with respect to the standard value is ±0.03 mm, when a horizontal axis represents the refractive index and a vertical axis represents the light transmission layer thickness, if the refractive index n becomes smaller than a lens load specification (standard value), a range which is shifted in a direction in which the light transmission layer thickness is increased is specified, and if it becomes larger, a range by which the light transmission layer thickness is not changed is specified.

However, the specifications of the above-described publicly known example are not appropriate in view of the following.

Presently, technology development to make a DVD further high density has proceeded in various companies. The spot size of focused light emitted on the information recording surface of an optical disk is in proportion to the wavelength and is in inverse proportion to the NA showing the iris angle of an objective lens for focusing light. Accordingly, in order to contract the spot size of focused light, aiming at improving the recording density, it is necessary to shorten the light source wavelength and increase the NA of the objective lens.

At this time since the refractive index of the light transmission layer is dependent upon the light source wavelength, it is necessary to newly specify the range of the light transmission layer thickness as a two-dimensional range with its refractive index. As an example of the light source wavelength, the NA, and the light transmission layer thickness of a next generation optical disk, it can be shown that the wavelength λ=405 nm, NA=0.65, and the light transmission layer thickness=0.6 mm.

BRIEF SUMMARY OF THE INVENTION

According to one aspect of the present invention, there is provided an optical disk which is constructed in such a manner that an information recording layer formed on a substrate is covered with a light transmission layer and in which the range of the thickness and the refractive index of the light transmission layer is set so that aberration due to a deviation of the thickness and the refractive index of the light transmission layer from each standard value falls within the range of certain acceptable values, wherein the thickness t of the light transmission layer is set within the range of f(n)−t1≦t≦f(n)+t2, employing function f(n) of the refractive index n of the light transmission layer and constants t1, t2 determined based on an acceptable value of aberration in the light transmission layer, the refractive index n of the light transmission layer is set within the range of 1.45 to 1.75, the numerical aperture of a lens emitting laser light which is incident onto the light transmission layer is set to 0.65, and the function f(n) is shown by $$f(n) = \frac{A_1 \times n^3}{n^2 - 1} \times \frac{n^2 + A_2}{n^2 + A_3} \text{ (mm)}$$

employing constants $A_1$, $A_2$, $A_3$.

According to one aspect of the present invention, the wavelength of the laser light which is incident onto the light transmission layer is set within the range of 395 to 415 nm and the constant $A_1$ is 0.26200, constant $A_2$ is −0.32400, and constant $A_3$ is 0.00595.

By choosing such numerical values, it is possible to restrict aberration of an optical system to a constant value or less and obtain operational stability.

DETAILED DESCRIPTION OF THE INVENTION

Embodiments of the present invention are explained below referring to drawings.

Figure 1:
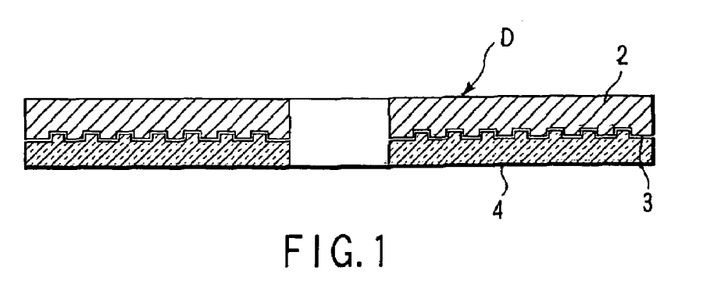
FIG. 1 is a cross-sectional view showing the structure of a first optical disk to which the present invention is applied.

FIG. 1 shows one example of a cross-sectional view of an optical disk 1 of the present invention. An information recording layer 3 including for example a phase change recording film is formed on (under in the figure) a substrate 2 made of polycarbonate. In the case where the optical disk 1 is a disk for the exclusive use of reproduction, an information recording layer 3 made of a metal reflective film instead of the phase change recording film is formed. Then a light transmitting layer 4 having a thickness of t is formed on (under in the figure) the information recording layer 3. The light transmitting layer 4 is for example polycarbonate.

Figure 2:
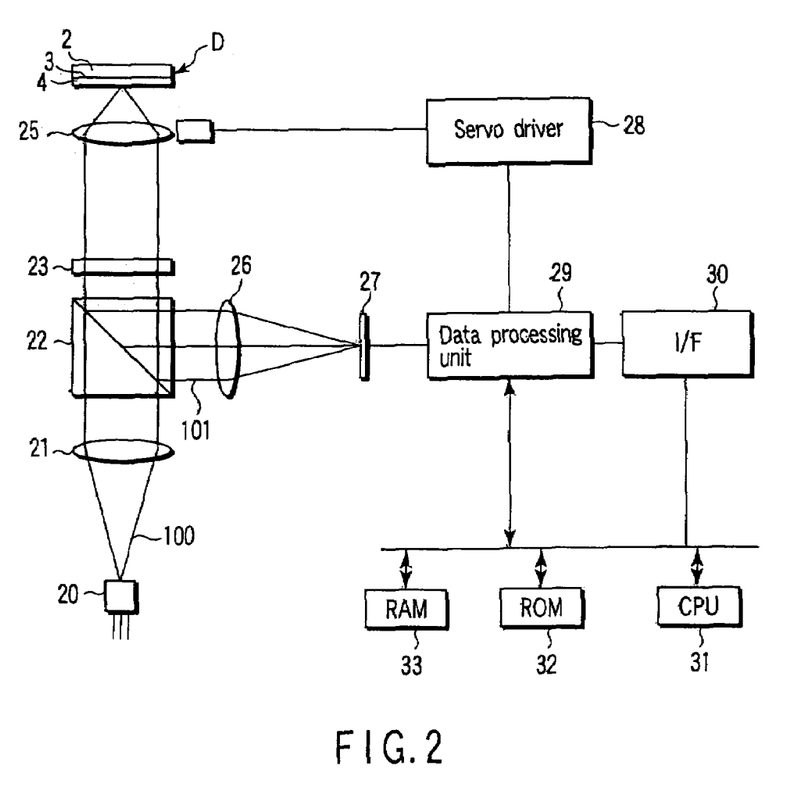
FIG. 2 is a block diagram showing an optical disk apparatus which performs recording and reproducing for an optical disk of the present invention.

Next, FIG. 2 shows an example of the formation of an optical disk apparatus for recording and reproducing data on the present disk. A semiconductor laser 20 of a short wavelength is employed as a light source. The wavelength of the emitted light is that of violet wavelength band generally of the range of 395 nm to 415 nm (405±10 nm). The light 100 emitted from the semiconductor laser light source 20 becomes parallel light by means of a collimator lens 21 and passes through a polarizing beamsplitter 22 and a λ/4 plate 23 to enter an objective lens 25. The range of the NA of the objective lens is for example 0.6 to 0.7. Thereafter, the emitted light 100 passes through the light transmission layer 4 of the optical disk 1 and is focused on the information recording layer 3.

Reflected light 101 by the information recording layer 3 of the optical disk 1 passes through the light transmitting layer 4 of the optical disk 1 again to pass through an objective lens 25 and the λ/4 plate 23 and is reflected by means of the polarizing beamsplitter 22 to pass through a photo detection optical system 26 to enter a photo detector 27. A light receiving portion of the photo detector 27 is generally divided into plural portions, and each light receiving portion outputs current in response to light intensity. The output current, after being converted into a voltage by an unillustrated I/V amplifier, is arithmetically processed into a RF signal, a focus error signal, and a track error signal by a data processing unit 29.

Based on these error signals, a servo driver 28 drives a lens drive coil 12 to move the lens 25 in a focus direction (lens optical axis direction) and a tracking direction (disk radius direction). As a result, a beam spot is generated on a target track of the information recording layer 3.

Here, when the thickness of the light transmission layer 4 falls into a standard value (for example, 0.6 mm), the apparatus has been designed in such a manner that the light enters the objective lens 25 as approximately parallel light. However, in the case where the thickness of the light transmission layer 4 departs from the standard value, a spherical aberration caused by a thickness error of the light transmission layer 4 occurs. At this time since convergent spot shape on the information recording layer 3 of the optical disk 1 is distorted, stable, correct recording and reproducing becomes difficult.

In a next generation optical disk apparatus, since the wavelength is further shortened and the NA is further increased compared to those of a conventional optical disk apparatus, applying conventional specified values of a DVD or a CD to manufacturing of a next generation optical disk as they are produces erroneous results. Thus, the optical disk 1 of the present invention is characterized by having the range of the thickness error and the refractive index of the light transmission layer 4 which is obtained by considering the trend of shortening the wavelength and increasing the NA in an optical disk apparatus.

Figure 3:
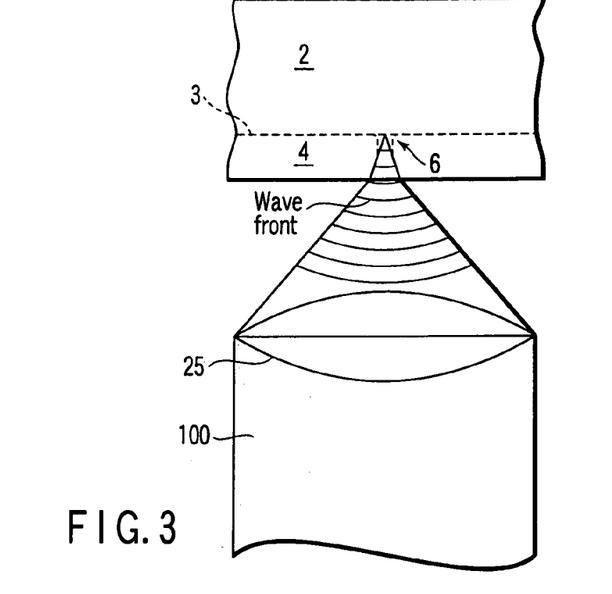
FIG. 3 is a view showing a manner in which a light beam is focused on a recording layer to generate a beam spot.

As specifications of a next generation optical disk system, the case where for example a light source wavelength is 405 nm and NA of the objective lens 25 is 0.65 is considered. FIG. 3 shows a manner in which the light beam 100 is focused on the recording layer 3 employing an ideal objective lens to which aberration is completely compensated with respect to the lens load in which in the light transmission layer of an optical disk the refractive index is 1.60 and the thickness is 0.6 mm so that a beam spot is generated. At this time wave front is in order, and wave front aberration, that is, curvature of wave front does not occur. However, when wave front aberration occurs due to residual spherical aberration of the lens system and the like, an ideal beam spot does not occur as shown by dotted curved lines 6 in the drawing.

Figure 4:
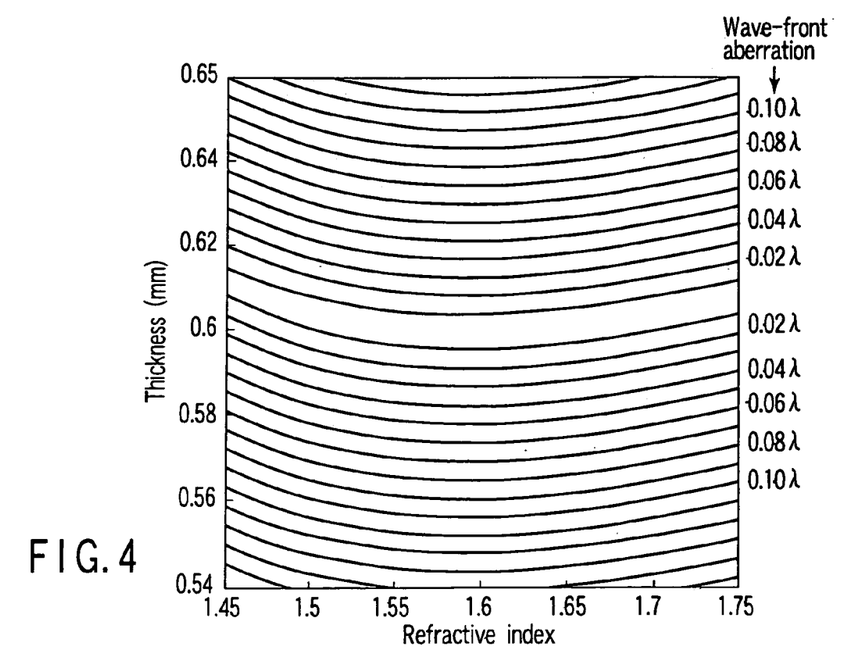
FIG. 4 is a view showing the relationship between the refractive index and the thickness of the light transmission layer of an optical disk, indicating a wave front aberration as a parameter.

FIG. 4 shows results obtained by calculation of rms (root mean square) values of wave front aberrations which occur in the case where optical disks 1 having various light transmission layer refractive indexes n and light transmission layer thicknesses t are employed instead of the above-described ideal objective lens. In FIG. 4, the horizontal axis represents the light transmission layer refractive index n and the vertical axis represents the light transmission layer thickness t, rms values of wave front aberrations at each point on the coordinates plane are displayed by contour lines. The interval of the contour lines represents 1/100 of light source wavelength (λ=405 . [nm]).

Through these results, when disks having various light transmission layer refractive indexes and thicknesses are employed, in order to make residual aberration amount a constant value, it can be seen that it is better to a bit more increase the light transmission layer thickness than the standard value if the refractive index is shifted in the direction in which the refractive index becomes larger or smaller than the lens load specification value. Accordingly, with respect to light transmission layer specifications of an optical disk of a next generation DVD, it is necessary to specify an error acceptable range of light transmission layer thicknesses in a way that the error acceptable range is changed in response to the absolute value of a deviation from the standard value, 1.60, of the light transmission layer refractive index.

Figure 5:
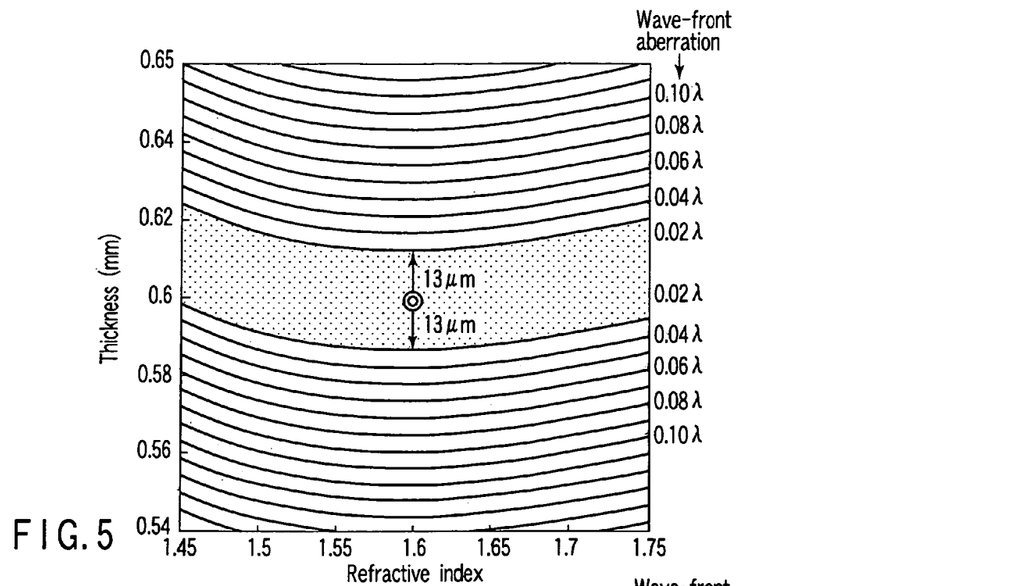
FIG. 5 is a view which shows the range of the refractive index and the thickness of a light transmission layer according to one embodiment of the present invention and which shows a range set in the case where the acceptable aberration is 0.03 λrms.

The range of the refractive indexes and thicknesses of the light transmission layers of optical disks according to one embodiment of the present invention is the range shown in FIG. 5. This shows the following area.

Refractive index n: $1.45 \leq n \leq 1.75$ (1)

Light transmission layer thickness
$A_1 = 0.26200$
$A_2 = -0.32400$
$A_3 = 0.00595$
t1, t2 = 13 (μm)

$$t: f(n) - t1 \leq tf(n) + t2 \, (\mu m) \quad (2)$$

$$f(n) = \frac{A_1 \times n^3}{n^2 - 1} \times \frac{n^2 + A_2}{n^2 + A_3} \, (mm) \quad (3)$$

The contour lines of the wave front aberration amounts of FIG. 4 line up approximately parallel to the vertical axis direction, and their curved lines can be shown as curved lines obtained by imparting a constant offset to equation (3) given above. Accordingly, when acceptable values of aberrations are determined, the range of the light transmission layer thicknesses and the refractive indexes can be determined through the equations (1) to (3) by making the acceptable values correspond to offset t1, t2.

In the case of the present embodiment, the range shown in FIG. 5 substantially corresponds to the range in which the aberration in FIG. 4 is 0.03 λrms or less. That is, the range of the thickness error ±13 μm (t1, t2=13 μm) corresponds to the range in which the aberration is 0.03 λrms or less. Accordingly, by specifying an optical disk of the range shown in FIG. 5, it is possible to maintain a condition that the aberrations due to deviations from the standard values (as one example, t=0.6 mm, n=1.60) of the light transmission layer thicknesses and the refractive indexes are approximately 0.03 λrms or less.

Figure 6:
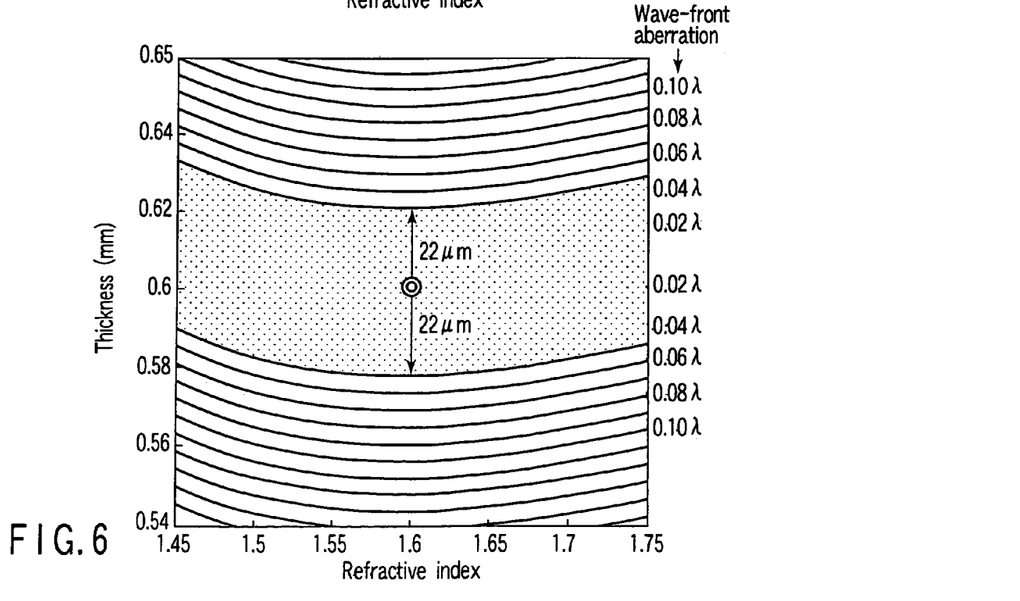
FIG. 6 is a view which shows the range of the refractive index and the thickness of a light transmission layer according to one embodiment of the present invention and which shows a range set in the case where the acceptable aberration is 0.05 λrms.

The acceptable values of aberrations are values determined according to performance or acceptable aberrations of an optical disk apparatus which performs recording or reproducing on an optical disk. At this time by changing t1, t2 in response to aberration acceptable values, the range of the light transmission layer thickness may be adjusted. For example, in the case where an acceptable aberration is 0.05 λ, by setting t1, t2=22 μm in the equation given above, an appropriate range can be specified (refer to FIG. 6). From the view point of present optical disk manufacturing, it is difficult to set t1, t2 to 10 μm or less. Therefore, minimum values of t1, t2 are about 10 μm.

Meanwhile, the range of the refractive index is determined by the material of the light transmission layer 2 and the wavelength of the light source, and a range in which an effective material as the material of the light transmission layer of an optical disk is contained is specified. In this case, by setting it to about 1.45 to 1.75, the refractive index in violet wavelength band of an effective material, such as polycarbonate, as the light transmission layer of an optical disk can be covered.

Figure 7:
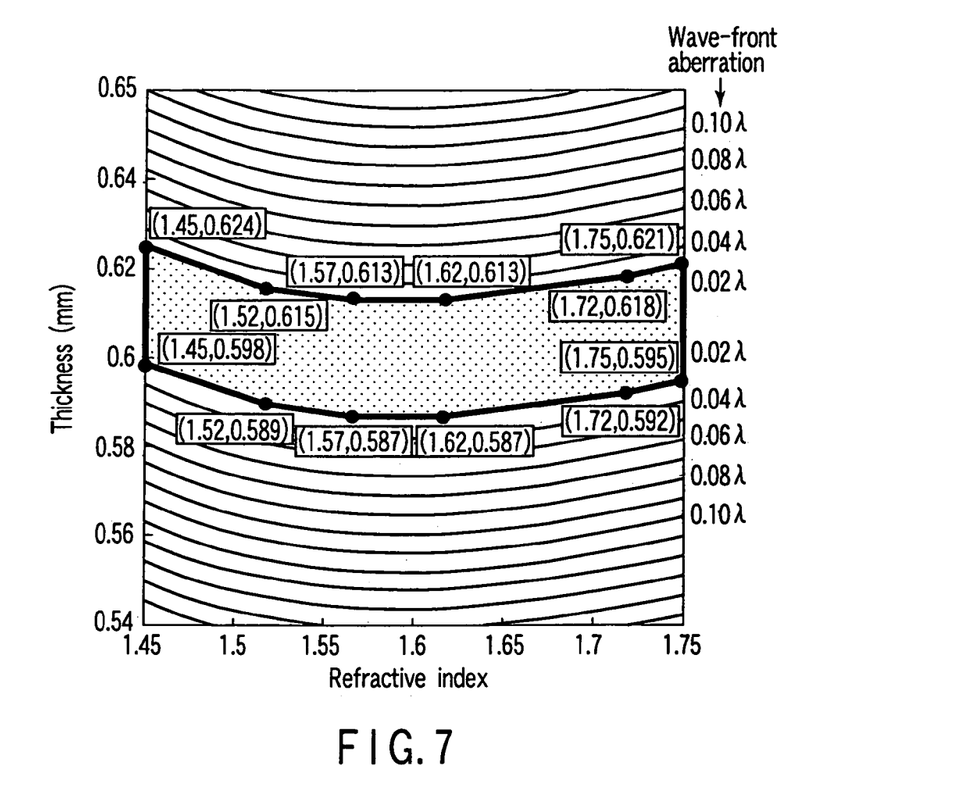
FIG. 7 is a view which shows the range of the refractive index and the thickness of a light transmission layer according to one embodiment of the present invention and which shows a straight line approximate range that is set in the case where the acceptable aberration is near 0.03 λrms.

Further, the range of the thickness and the refractive index of the light transmission layer of an optical disk according to another embodiment of the present invention has a range shown in FIG. 7. This range, although being approximately similar to the range of the optical disk of the embodiment shown in FIG. 5, is an area which is not encircled by curved lines but is encircled by straight lines. Its effect is similar to that of the optical disk of the embodiment described above.

Figure 11:
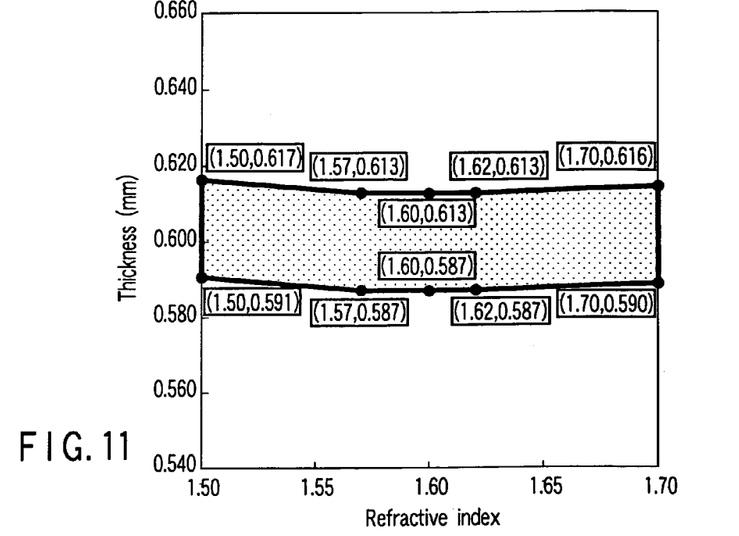
FIG. 11 is a view which shows the range of the refractive index and the thickness of a light transmission layer according to one embodiment of the present invention and which shows another straight line approximate range that is set in the case where the acceptable aberration is near 0.03 λrms.

Furthermore, the range of the thickness and the refractive index of the light transmission layer of an optical-disk according to another embodiment of the present invention is shown in FIG. 11. In FIG. 11, the range of the thickness and the refractive index of the light transmission layer, although being defined by values which partly differ from those of FIG. 7, is not largely different therefrom. That is, the range is defined at the points of the refractive indexes 1.5 and 1.7. This embodiment has a similar effect that the refractive index can be covered in violet wavelength band of a material, such as polycarbonate and the like, which is effective as the light transmission layer of an optical disk.

Figure 8:
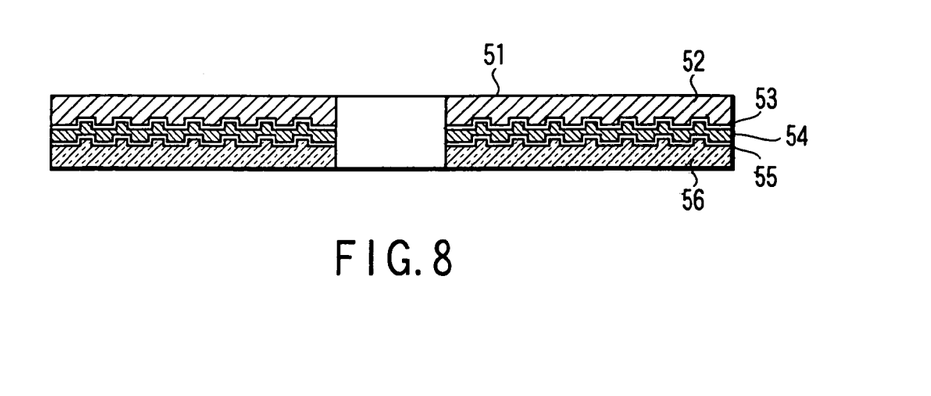
FIG. 8 is a cross-sectional view showing the structure of a second optical disk to which the present invention is applied.

Next, FIG. 8 shows an example of a cross-sectional view of an optical disk 51 according to another embodiment of the present invention. An information recording layer 53 including for example a phase change recording film on (under in the drawing) a substrate 52 made of polycarbonate is formed. A space layer 54 having transparency is formed thereon, and another information recording layer 55 is formed further thereon. The information recording layers 53 and 55 may be layers for the exclusive use of reproduction, both of which are made of metallic reflection films, and both may be recordable and reproducible layers, or only one of which may be a reproduction-only layer and another of which may be recordable and reproducible layer. A light transmission layer 56 is formed on the information recording layer 55. The light transmission layer 56 is for example made of polycarbonate. As a manufacture process, a substrate 52 for example on which the information recording layer 53 is formed and the light transmission layer 56 on which the information recording layer 54 is formed are glued via a pressure sensitive adhesive such as a ultraviolet ray setting resin (to be the space layer 54).

The role of the space layer 54 is to optically shut out information leak (cross talk) from another information recording layer when one side information recording layer is reproduced. In that sense, the interval of the two information recording layers is better to be as large as possible, and the thickness of the space layer 54 is better to be thick. However, in that case, a load is put on a recording and reproducing optical system. That is, in the case where the thickness from the surface of the light transmission layer to the center of the space layer is specified as the load of the objective lens, even if either one of information recording layers is recorded and reproduced, aberration due to the thickness error of half the thickness of the space layer occurs. Accordingly, in view of the aberration of the recording and reproducing optical system, the thickness of the space layer is better to be thin. That is, the thickness of the space layer is set to a compromise point of trade off relationship in the cross talk of the information recording layer and the aberration of the recording/reproducing optical system.

Figure 9:
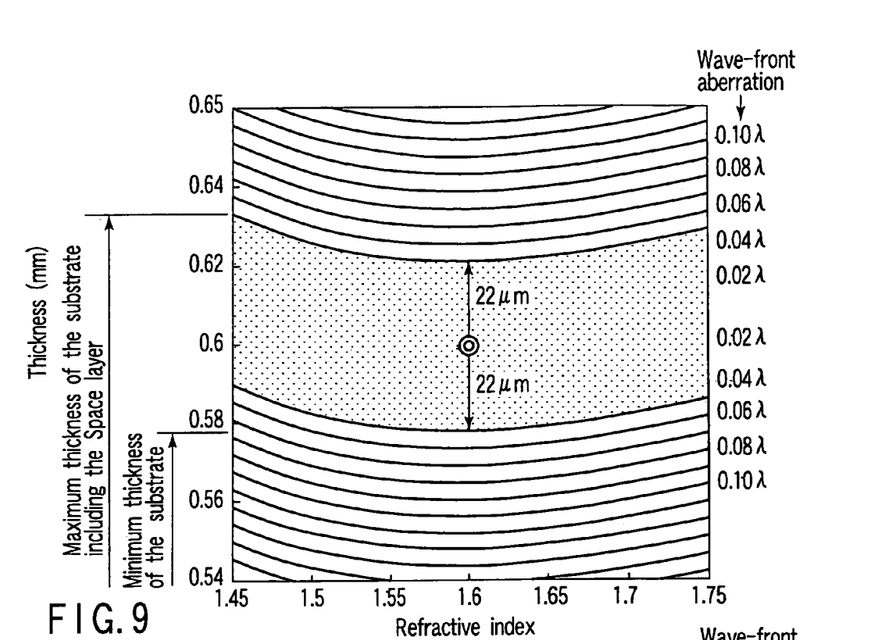
FIG. 9 is a view which shows the range of the refractive index and the thickness of a light transmission layer according to one embodiment of the present invention and which shows a range that is set for the second optical disk in the case where the acceptable aberration is 0.05 λrms.

As specifications of a next generation optical disk system, in the case where for example light source wavelength of 405 nm and NA of an objective lens 25=0.65 are employed, it is appropriate that the thickness of the space layer is about 20 µm to 30 µm, considering the trade off. It is better to represent a thickness specification of the light transmission layer of a two layer disk by a minimum value of the thickness of the light transmission layer 56 and a maximum value of the sum of thicknesses of the light transmission layer 56, the information recording layer 55 in contact with this light transmission layer, and the space layer 54. The range of the thickness and the refractive index of the light transmission layer of the optical disk at this time becomes the range shown in FIG. 9. Similarly to the embodiments above, it is assumed that the lens load in which the refractive index of the light transmission layer of the optical disk is 1.60 and the thickness is 0.6 mm and that acceptable aberration of the system is 0.05 λ. The specified area is the area shown below:

Refractive index n: $1.45 \leq n \leq 1.75$

Light transmission layer thickness: $f(n)-t1$ or more

Thicknesses of the light transmission layer+the information recording layer 55+the space layer 54: $f(n)+t2$ or less $t1, t2 = 22$ µm f(n) is according to equation (3).

Like this, since the acceptable aberration is set to 0.05 λ, considering the thickness of the space layer, the range of the thickness direction is widened compared to the case of single layer. The refractive index of the space layer is set within the range of +0.0 to −0.15 of the refractive index of the light transmission layer 56.

Figure 10:
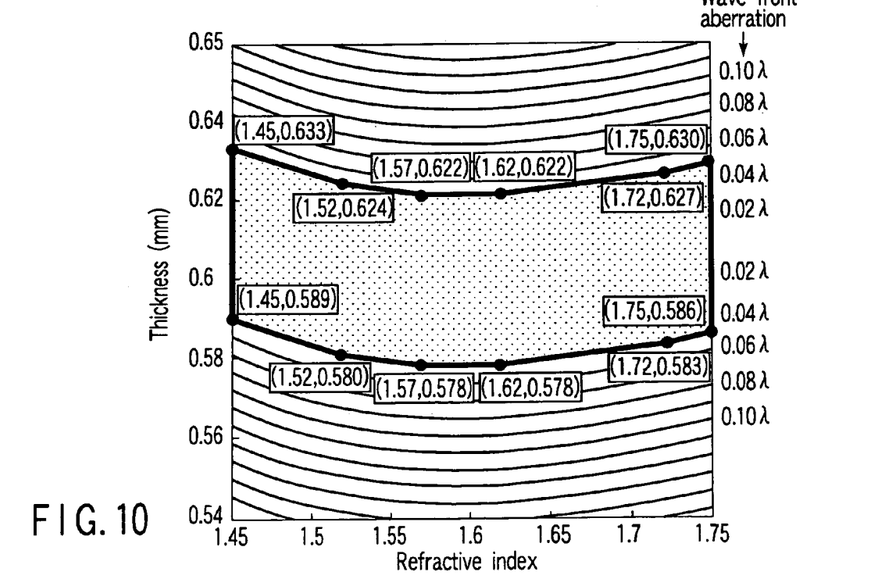
FIG. 10 is a view which shows the range of the refractive index and the thickness of a light transmission layer according to one embodiment of the present invention and which shows a straight line approximate range that is set in the case where the acceptable aberration is near 0.05 λrms.

Moreover, the range of the thickness and the refractive index of the light transmission layer of an optical disk of another embodiment of the present invention has the range shown in FIG. 10. This range, although being substantially similar to the range of the optical disk of the embodiment shown in FIG. 9, is an area which is not encircled by curved lines but is encircled by straight lines. Its effect is similar to that of the optical disk of the embodiment described above.

Figure 12:
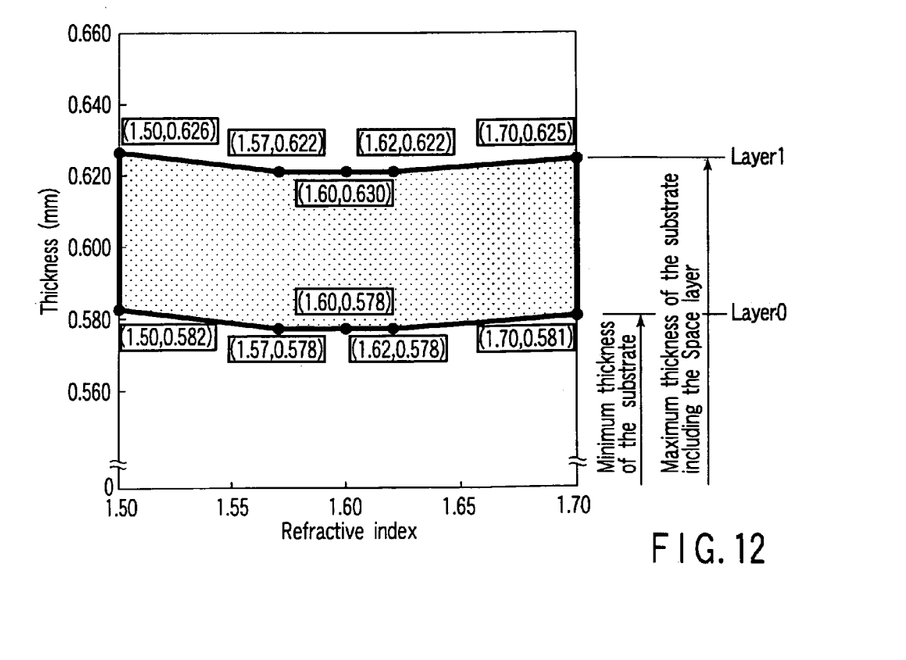
FIG. 12 is a view which shows the range of the refractive index and the thickness of a light transmission layer according to one embodiment of the present invention and which shows another straight line approximate range that is set in the case where the acceptable aberration is near 0.05 λrms.

Furthermore, the range of the thickness and the refractive index of the light transmission layer of an optical disk according to another embodiment of the present invention is shown in FIG. 12. In FIG. 12; although the range of the thickness and the refractive index of the light transmission layer is defined by values which are partly different from those in FIG. 10, the range is not largely different therefrom. That is, the range is defined at the points of the refractive indexes 1.5 and 1.7. This embodiment has a similar effect that the refractive index can be covered in violet wavelength band of a material, such as polycarbonate and the like, which is effective as the light transmission layer of an optical disk.

Although the three embodiments show the cases where the information recording layer are two layers, it is needless to say that the embodiments can be applied to an optical disk having two or more information recording layers.

As explained above, according to the present invention, it is possible to specify the range of the light transmission layer thickness and the light transmission layer refractive index which is effective in a next generation disk and to provide an optical disk which is suitable for a high density recording.

What is claimed is:

1. An optical disk which is constructed in such a manner that an information recording layer formed on a substrate is covered with a light transmission layer and in which the range of the thickness and the refractive index of the light transmission layer is set so that aberration due to a deviation of the thickness and the refractive index of the light transmission layer from each standard value falls within the range of certain acceptable values, wherein the thickness t of the light transmission layer is set within the range of $f(n)-t1 \leq t \leq f(n)+t2$, employing function f(n) of the refractive index n of the light transmission layer and constants t1, t2 determined based on an acceptable value of aberration in the light transmission layer, the refractive index of the light transmission layer is set within the range of 1.5 to 1.7, the numerical aperture of a lens emitting laser light which is incident onto the light transmission layer is set to 0.65, and the function f (n) is shown by $$f(n) = \frac{A_1 \times n^3}{n^2 - 1} \times \frac{n^2 + A_2}{n^2 + A_3} (mm)$$

employing constant A1, A2, A3, wherein the constant Al is 0.26200, constant A2 is -0.32400 and constant A3 is 0.00595;

the acceptable value of aberration in the transmission layer is 0.03 λrms, the constants t1, t2 are substantially set to 13 µm, predetermined position on curved lines that f(n)−t1 and f(n)+t2 show are sampled, and an area encircled by connecting each sample point by means of straight lines is set as the range of the thickness t of the light transmission layer, and the thickness of the light transmission layer is 0.6 mm.

2. An optical disk which is constructed in such a manner that a plurality of information recording layers are laminated by sandwiching a space layer having a light transmission property therebetween on a substrate and are covered with a light transmission layer, wherein the thickness t of the light transmission layer is set to f(n)−t1 or more, employing function f(n) of the refractive index n of the light transmission layer and constants t1, t2 determined based on an acceptable value of aberration in the layer comprising the light transmission layer, the information recording layers, and the space layer, the sum of thicknesses of the light transmission layer, the space layer, and the information recording layer excluding the information recording layer which is closest to the substrate is set to f(n)+t2 or less, the refractive index of the light transmission layer is set within the range of 1.5 to 1.7, the refractive index of the space layer is set within the range of +0.0 to −0.15 of the refractive index of the light transmission layer, and the numerical aperture of a lens emitting laser light which is incident onto the light transmission layer is set to 0.65, and the function f (n) is shown by $$f(n) = \frac{A_1 \times n^3}{n^2 - 1} \times \frac{n^2 + A_2}{n^2 + A_3} \text{(mm)}$$

employing constants A1, A2, A3, wherein the constant A1 is 0.26200, constant A2 is −0.32400, and constant A3 is 0.00595;

the acceptable value of aberration in the transmission layer is 0.05 λrms, the constants t1, t2 are substantially set to 22 μm, predetermined position on curved lines that f(n)−t1 and f(n)+t2 show are sampled, and an area encircled by connecting each sample point by means of straight lines is set as the range of the thickness t of the light transmission layer, and the thickness of the light transmission layer is 0.6 mm.

3. An optical disk apparatus characterized by comprising:

a semiconductor laser element emitting laser light whose wavelength is 395 to 415 nm;

a lens, which has a numerical aperture being set to 0.65, emitting a laser light onto the light transmission layer; and a processing unit allowing the laser light from the semiconductor laser element to be emitted to the optical disk to perform recording processing and reproducing processing, for an optical disk which is constructed in such a manner that an information recording layer formed on a substrate is covered with a light transmission layer and in which the range of the thickness and the refractive index of the light transmission layer is set so that aberration due to a deviation of the thickness and the refractive index of the light transmission layer from each standard value falls within the range of certain acceptable values, wherein the thickness t of the light transmission layer is set within the range of f(n)−t1≦t≦f(n)+t2, employing function f(n) of the refractive index n of the light transmission layer and constants t1, t2 determined based on an acceptable value of aberration in the light transmission layer, the refractive index of the light transmission layer is set within the range of 1.5 to 1.7, the numerical aperture of a lens emitting laser light which is incident onto the light transmission layer is set to 0.65, and the function f(n) is shown by $$f(n) = \frac{A_1 \times n^3}{n^2 - 1} \times \frac{n^2 + A_2}{n^2 + A_3} \text{(mm)}$$

employing constants A1, A2, A3, wherein the constant A1 is 0.26200, constant A2 is −0.32400, and constant A3 is 0.00595;

the acceptable value of aberration in the transmission layer is 0.033λrms, the constants t1, t2 are substantially set to 13 μm, predetermined position on curved lines that f(n)−t1 and f(n)+t2 show are sampled and an area encircled by connecting each sample point by means of straight lines is set as the range of the thickness t of the light transmission layer, and the thickness of the light transmission layer is 0.6 mm.

4. An optical disk apparatus characterized by comprising:

a semiconductor laser element emitting laser light whose wavelength is 395 to 415 nm;

a lens, which has a numerical aperture being set to 0.65, emitting a laser light onto the light transmission layer; and a processing unit allowing the laser light from the semiconductor laser element to be emitted to the optical disk to perform recording processing and reproducing processing, for an optical disk which is constructed in such a manner that a plurality of information recording layers are laminated by sandwiching a space layer having a light transmission property therebetween on a substrate and are covered with a light transmission layer, wherein the thickness t of the light transmission layer is set to f(n)+t1 or more, employing function f(n) of the refractive index n of the light transmission layer and constants t1, t2 determined based on an acceptable value of aberration in the layer comprising the light transmission layer, the information recording layers, and the space layer, the sum of thicknesses of the light transmission layer, the space layer, and the information recording layer excluding the information recording layer which is closest to the substrate is set to f(n)+t2 or less, the refractive index of the light transmission layer is set within the range of 1.5 to 1.7, the refractive index of the space layer is set within the range of +0.0 to −0.15 of the refractive index of the light transmission layer, and the numerical aperture of a lens emitting laser light which is incident onto the light transmission layer is set to 0.65, and the function f(n) is shown by $$f(n) = \frac{A_1 \times n^3}{n^2 - 1} \times \frac{n^2 + A_2}{n^2 + A_3} \text{(mm)}$$

employing constants A1, A2, A3, wherein the constant A1 is 0.26200, constant A2 is −0.32400, and constant A3 is 0.00595;

the acceptable value of aberration in the transmission layer is 0.05 λrms, the constants t1, t2 are substantially set to 22 μm, predetermined position on curved lines that f(n)−t1 and f(n)+t2 show are sampled, and an area encircled by connecting each sample point by means of straight lines is set as the range of the thickness t of the light transmission layer, and the thickness of the light transmission layer is 0.6 mm.

* * * * *